United States Patent [19]

Nonaka et al.

[11] Patent Number: 5,252,656
[45] Date of Patent: Oct. 12, 1993

[54] POLYARYLENE SULFIDE RESIN MOLDING COMPOSITION

[75] Inventors: Toshifumi Nonaka, Urayasu; Katsutoshi Suzuki, Fuji, both of Japan

[73] Assignee: Polyplastics Co., Ltd., Osaka, Japan

[21] Appl. No.: 727,947

[22] Filed: Jul. 10, 1991

[30] Foreign Application Priority Data

Jul. 12, 1990 [JP] Japan .................................. 2-184878

[51] Int. Cl.$^5$ ................................................ C08K 3/00
[52] U.S. Cl. ..................................... 524/449; 524/609
[58] Field of Search ................................. 524/449, 609

[56] References Cited

U.S. PATENT DOCUMENTS

| | | | |
|---|---|---|---|
| 4,066,604 | 1/1978 | Wang | 524/449 |
| 4,703,074 | 10/1987 | Izutsu et al. | 524/262 |
| 4,806,586 | 2/1989 | Nakai | 524/449 |
| 5,066,704 | 11/1991 | Wehnert | 524/449 |

Primary Examiner—John C. Bleutge
Assistant Examiner—Mark Sweet
Attorney, Agent, or Firm—Depaoli & O'Brien

[57] ABSTRACT

A polyarlene sulfide resin molding composition suitable for molding and providing a molded article having excellent surface appearance and improved mechanical properties comprises
(A) 100 parts by weight of a polyarylene sulfide resin and
(B) 5 to 150 parts by weight of "white" mica (muscovite mica).

13 Claims, No Drawings

POLYARYLENE SULFIDE RESIN MOLDING COMPOSITION

BACKGROUND OF THE INVENTION

Field of the Invention

The present invention relates to a polyarylene sulfide resin composition which can form a molded article having less deformation, excellent surface appearance and gloss and exhibiting excellent mechanical properties for practical use. The resin composition is suitable for the preparation of structural or mechanical parts, exterior trim parts of electrical or electronic appliances, automobiles and other general apparatus, and particularly molded articles requiring high dimensional accuracy.

Recently thermoplastic resins which have good heat resistance, mechanical properties and chemical resistance and excellent flame retardance have been demanded as the material of construction for components of electrical or electronic appliances, automobile devices or chemical instruments. Polyarylene sulfide (PAS) resin represented by polyphenylene sulfide (PPS) is one of the resins satisfying this demand. Due to the relative low cost of PAS resin and the excellent physical properties thereof, the demand for PAS resin has increased.

However, polyarylene sulfide resin has essential disadvantages including poor toughness and brittleness and poor mechanical properties represented by impact resistance. Generally, the addition of a fibrous reinforcement such as glass fiber or carbon fiber or other inorganic fillers has been carried out in order to overcome these disadvantages.

Although such means remarkably improve the strength, stiffness and heat resistance of polyarylene sulfide resin so as to permit the use of the resin as an engineering plastic, a further improvement in the physical properties thereof has been frequently required as the fields of use the resin have widened. In particular, most of the chassis, cases and other precision parts among the parts of various apparatus are required to exhibit not only excellent heat resistance and mechanical properties but also a sufficiently high dimensional accuracy so as not to cause warpage or deformation during molding and service. However, molded articles made from polyarylene sulfide resin compositions containing fibrous reinforcement such as glass fiber suffer from deformation, i.e., "warpage" owing to the enhanced anisotropy of the composition. In order to solve this problem, there have been made many proposals such as the addition of powdery material such as glass bead or flaky reinforcement such as talc, mica or glass flake. Further, attempts have been made to improve both the strength and the deformation resistance by the simultaneous use of a fibrous reinforcement and a flaky material.

Among these reinforcements and fillers, mica is generally inexpensive and is effective not only in reducing the deformation of a PAS molded article but also in improving the electrical characteristics (such as dielectric strength) and heat resistance thereof, thus allowing molded PAS to be useful for electrical components and mechanical parts. However, a molded article made from a mica-filled PAS resin composition is still insufficient in practical strengths, so that a further improvement in the physical properties thereof has been frequently required as the fields of use of molded PAS have widened. Although mica must be added in an amount of at least 5 parts by weight, generally 15 parts by weight or above per 100 parts by weight of a PAS resin in order to reduce the warpage and deformation of a molded article of the resin, a PAS resin composition containing mica in such an amount has other problems. For example, the mechanical properties of a molded article made from the micafilled PAS composition, particularly the strengths of a molded article having a weld are lowered and the surface of an injection molded article made from the composition is rough or poor in gloss so as to lower the sales appeal of the article.

For example, Japanese Patent Laid-Open No. 63355/1982 discloses a polyarylene sulfide resin composition having improved resistance to warpage and deformation, which is characterized by containing a mica, at least 90% by weight of which is composed of particles with a diameter smaller than the opening of a 100-mesh JIS standard screen and which contains magnesium and iron at a weight ratio of Mg to Fe of 2 or above and bonding water in an amount of 2% by weight or below and exhibits a dehydration initiating temperature of 400° C. or above. As described in the above patent document, the mica satisfying these requirements is phlogopite (the so-called "amber" mica) represented by Suzorite mica which contains a relatively large amount of magnesium white. Other micas are unsuitable because they give a composition poor in strengths and toughness. The inventors of the present invention have studied the characteristics of the compositions prepared by adding various micas including amber mica to a PAS resin to find out that a molded article prepared from a composition comprising a PAS resin and amber mica surprisingly exhibits remarkably lowered mechanical strengths, particularly in a weld which is generally present in a molded article, and is unsuitable for practical use with respect to strengths, although the warpage and deformation of the composition upon molding are reduced to some extent. The term "weld" used in this specification refers to the junction of molten resin streams during molding. For example, a weld is always present when molding is conducted by injection through two gates or when an article having a hole or an empty space, such as a ring, is produced by injection molding even through one gate. That is, the presence of a weld cannot be avoided in many molded articles. Accordingly, the lowering in the strengths of a weld is a significant problem in practice. Although the problem can be solved to some extent by controlling the cylinder temperature, injection pressure and mold temperature during molding, the problem is fatal particularly to a mica filled PAS resin.

With the purpose of improving the mica filled PAS resin composition of the prior art in mechanical strengths, particularly the weld strength of a molded article, and surface appearance while keeping the excellent deformation resistance, heat resistance and electrical properties of the composition and thereby providing a practically useful composition having well balanced characteristics, the inventors of the present invention have made comparative studies on various micas to find out that a specific mica which has hardly been used as a filler for plastics is effective for the above purpose. The present invention has been accomplished on the basis of this finding.

SUMMARY OF THE INVENTION

Namely, the present invention relates to a polyarylene sulfide resin molding composition comprising
(A) 100 parts by weight of a polyarylene sulfide resin and
(B) 5 to 150 parts by weight "white" mica (muscovite mica).

DETAILED DESCRIPTION OF THE INVENTION

To describe the constituents of the present invention, the polyarylene sulfide resin (A) according to the present invention is mainly composed of repeating units represented by the formula: $+Ar-S+$ (wherein Ar is an arylene group).

Examples of the arylene group include p-phenylene, m-phenylene, o-phenylene, substituted phenylene, p,p'-diphenylene sulfone, p,p'-biphenylene, p,p'-diphenylene ether, p,p'-diphenylenecarbonyl and naphthalene groups.

Although the polyarylene sulfide resin (A) may be a homopolymer composed of the same arylene sulfide repeating units among those described above, the use of a copolymer composed of a plurality of repeating units different from each other is preferable with respect to the processability of molding in some cases.

Particularly, a substantially linear homopolymer composed of p phenylene sulfide repeating units is preferably used as the homopolymer.

Although the copolymer may be any one comprising two or more arylene sulfide repeating units different from each other selected from among those described above, a copolymer comprising a combination of p-phenylene sulfide repeating units and m-phenylene sulfide repeating units is preferable. Particularly, it is suitable with respect to heat resistance, moldability and mechanical characteristics to use a substantially linear copolymer comprising at least 60 molar %, more suitably at least 70 molar % of p phenylene sulfide repeating units. Further, it is preferable that the copolymer contain m phenylene sulfide repeating units in an amount of 5 to 40 molar particularly 10 to 25 molar %. Among these copolymers, a block copolymer (for example, one described in Japanese Patent Laid Open No. 14228/1986) is preferred to a random one.

The polyarylene sulfide resin to be used in the present invention as the component (A) may be either one prepared by increasing the melt viscosity of a relatively low-molecular-weight polymer by oxidative or thermal crosslinking to improve the processability in molding or a substantially linear high-molecular-weight polymer prepared by the polycondensation of a monomer component mainly composed of difunctional monomers. In many cases, the latter is superior to the former in respect of the characteristics of a molded article.

According to the present invention, a crosslinked polyarylene sulfide resin prepared by the use of a monomer having at least 3 functional groups as a part of the monomer component or a blend thereof with a linear polymer as described above may be also favorably used as the polyarylene sulfide resin (A).

It is preferable that the polyarylene sulfide resin to be used in the present invention as a base resin have a melt viscosity of 50 to 5000 P (310° C., shear rate: 1200/sec). Particularly, a PAS resin having a melt viscosity of 100 to 3000 P is still preferable with respect to the balance between mechanical properties and fluidity. When the melt viscosity is too low, the mechanical properties are poor unfavorably while when it exceeds 5000 P, the composition exhibits low fluidity in injection molding to render the molding unfavorably difficult.

The component (B) according to the present invention is white mica generically called muscovite, which scarcely contains magnesium or contains an extremely small amount thereof (at most 5% by weight, generally 2% by weight or below in terms of MgO) and is represented by the general formula: $mSiO_2 \cdot nAl_2O_3 \, pFe_2O_3 \cdot qM_2O \cdot rH_2O$ (wherein M is an alkali metal). Accordingly, it is distinguishable from amber mica (phlogopite mica) represented by the formula: $KAl_2(AlSi_3O_{10})(OH)_2$ or a formula similar thereto and including Suzorite which is well-known as a filler for plastics as a representative example. Namely, as described in the Japanese Patent Laid-Open No. 63355/1982, the phlogopite mica or amber mica which is conventionally used as a filler for plastics is represented by the compositional formula: $KMg_3(AlSi_3O_{10})OH$, $K_2Mg_{4-5}Fe_{1-2}(Al_{2-3}Si_{5-6}O_{20})(OH)_2F_2$ or a formula similar thereto and contains magnesium in an amount as large as at least 10% by weight, generally 20% by weight or above in terms of MgO. In these respects, the amber mica can be distinguished from white mica which is used in the present invention.

It is an unexpectable advantage of the present invention that white mica is superior to amber mica which has been used as a filler for various plastics with respect to the characteristics as a filler for PAS resin. In particular, while mica provides a molded article with improved weld strength which is a defect common to mica-filled resin compositions. Although the reason for this advantage is not apparent, the advantage is inferred to result from the difference between white and amber micas in cleavage properties and the adhesion to PAS resin, which is due to the compositional and structural differences between both micas.

With respect to the shape of the white mica to be used in the present invention, the mean particle is preferably 1 to 65 μm, still preferably 2 to 30 μm and the mean aspect ratio is 10 or above, preferably 10 to 60. Particularly, a white mica having a mean particle diameter of 2 to 30 μm and a mean aspect ratio of 10 to 50 can provide a molded article with both excellent resistance to warpage and deformation and in weld strength, thus being more effective.

The term "mean particle diameter" used in this specification refers to a median of the mean particle size distribution determined according to the centrifugal settling method (rotational speed: 600 rpm) with a measuring instrument for particle size distribution of centrifugal settling type mfd. by Shimadzu Corporation (SA CP 2 type), while the mean aspect ratio is calculated according to the following equation:

$$R = \frac{l}{d}$$

wherein
R: aspect ratio
l: mean particle diameter
d: mean thickness

The mean thickness (d) used above was calculated based on the area (S) of the closest packing monoparticulate film of mica on water surface determined according to the water-surface monoparticulate film method [see M. Nishino et al., Zairyo (Materials), 27, 696 (1978)].

If a conventional white mica having a mean particle diameter of 65 μm or above is used, the weld strength of the resulting molded article will be low, although the resistance thereof to deformation (warpage) will be effectively improved. On the other hand, a white mica having a mean particle diameter of 1 μm or below is difficult to prepare to give a low yield uneconomically. If the aspect ratio is lower than 10, the effect of reducing the deformation (warpage) will be low, though the weld strength will be improved.

According to the present invention, the amount of the white mica used is 5 to 150 parts by weight, preferably 10 to 100 parts by weight per 100 parts by weight of the PAS resin. If the amount is too small, the resulting molded article will have hardly improved resistance to warpage and deformation, while if the amount is too large, the resulting composition will be problematic with respect to processability during molding and in mechanical properties. Further, the amount of the mica to be used varies also depending upon the amount of the filler (C) which will be described below.

The molding composition of the present invention, may further contain a filler (C) other than the white mica.

Although the filler (C) is not necessarily an essential component in the present invention, the addition thereof is preferable for producing a molded article which has excellent in mechanical strengths, stiffness, heat resistance, dimensional stability, electrical properties and other performances. The filler (C) may be selected from among fibrous and powdery ones depending upon the object of use.

The fibrous filler includes inorganic fibrous materials, for example, glass fiber, asbestos fiber, carbon fiber, silica fiber, silica/alumina fiber, zirconia fiber, boron nitride fiber, silicon nitride fiber, boron fiber and potassium titanate fiber, and fibers of metals such as stainless steel, aluminum, titanium, copper or brass. Among them, glass fiber and carbon fiber are most representative. Further, the fibrous filler includes high-melting organic fibrous materials and particular examples thereof include polyamides, fluororesins and acrylic resins.

The powdery filler includes carbon black, silica, quartz powder, glass bead, glass powder, silicates such as calcium silicate, aluminum silicate, kaolin, talc, clay, diatomaceous earth and wollastonite; metal oxides such as iron oxides, titanium oxide and alumina; metal carbonates such as calcium carbonate and magnesium carbonate; metal sulfates such as calcium sulfate and barium sulfate; silicon carbide, silicon nitride, boron nitride and various metal powders.

These inorganic fillers may be used alone or as a mixture of two or more of them. As well known, a fibrous filler is apt to increase the warpage and deformation of a PAS resin, so that the simultaneous use of such a fibrous filler and white mica according to the present invention is particularly meaningful because it is more effective in reducing the warpage and deformation and high mechanical strengths are imparted to the resin by virtue of the action of the fibrous reinforcement. The use of glass fiber as the component (C) is particularly preferable. Although the amount of the filler (C) varies depending upon that of the mica used, it is 150 parts by weight or below, preferably 5 to 100 parts by weight per 100 parts by weight of the PAS resin. It is preferable that the total amount of the filler (C) and the mica (B) be 250 parts by weight or below per 100 parts by weight of the PAS resin.

It is preferable that the composition of the present invention further contain an alkoxysilane compound (D).

The alkoxysilane compound to be used as the component (D) is one or more members selected from among vinylalkoxysilane, epoxyalkoxysilane, aminoalkoxy silane and mercaptoalkoxysilane.

Examples of the vinylalkoxysilane include vinyl triethoxysilane, vinyltrimethoxysilane and vinyltris(β-methoxyethoxy)silane.

Examples of the epoxyalkoxysilane include γ-glycidoxypropyltrimethoxysilane, β-(3,4-epoxycyclohexyl)ethyltrimethoxysilane and γ-glycidoxypropyltriethoxysilane.

Examples of the aminoalkoxysilane include γ-aminopropyltrimethoxysilane, γ-aminopropyltriethoxysilane, γ-aminopropylmethyldimethoxysilane, γ-aminopropylmethyldiethoxysilane, N(β-aminoethyl)-γ-aminopropyltrimethoxysilane, γ-diallylaminopropyltrimethoxysilane and γdiallylaminopropyltrimethoxysilane.

Examples of the mercaptoalkoxysilane include γ-mercaptopropyltrimethoxysilane and γ-mercaptopropyltriethoxysilane.

The amount of the alkoxysilane compound to be used as the component (D) is 0.1 to 5 parts by weight, preferably 0.1 to 3 parts by weight per 100 parts by weight of the PAS resin (A).

Although the alkoxysilane compound serves to improve the resistance to warpage and deformation and the mechanical properties, the use thereof in too large an amount increases the melt viscosity to cause trouble during molding.

The alkoxysilane compound may be added either as such or in the form preliminarily deposited on the white mica (B) or the filler (C).

The molding composition of the present invention may auxiliarily contain a small amount of another thermoplastic resin. The thermoplastic resin to be auxiliarily used may be any one as far as it is stable at high temperature. Examples thereof include polyolefin, aromatic polyester prepared from an aromatic dicarboxylic acid and a diol or a hydroxy carboxylic acid, such as polyethylene terephthalate, polybutylene terephthalate and wholly aromatic polyesters; polyamide, polycarbonate, ABS, polyphenylene oxide, polyalkyl acrylate, polyacetal, polysulfone, polyether sulfone, polyether imide, polyether ketone and fluororesin. These thermoplastic resins may be used also as a mixture of two or more of them. Particularly, it is preferable to use, as the auxiliary resin, an ethylene copolymer or its graft copolymer, for example, a copolymer comprising ethylene and an α,β-unsaturated aliphatic acid or an alkyl or glycidyl ester thereof, or a graft copolymer comprising this copolymer and a vinyl polymer grafted thereonto.

Further, the composition of the present invention may contain conventional additives depending upon the object. Examples thereof include antioxidant, heat stabilizer, lubricant, nucleating agent, ultraviolet absorber, coloring agent, mold release agent and other thermoplastic resins.

The composition of the present invention can be easily prepared by a conventional process for the preparation of a reinforced or filled resin. For example, the resin, white mica and other additives are mixed and extruded together into pellets, followed by the molding of the pellets. Alternatively, a process which comprises mixing pellets different from each other in composition and molding the obtained pellet mixture to obtain an article made from the composition according to the present invention or a process of directly feeding one or more of the components into a molding machine may be employed Further, it is preferable in order to facilitate the dispersion of the components in each other that a part or the whole of the resin component be preliminarily pulverized and mixed with the other components, followed by the feeding of the obtained mixture into an extruder. Furthermore, a process of adding the inorganic components in the course of the melt extrusion of the resin component is also preferable.

As described above, the PAS resin molding composition of the present invention can provide a molded article with extremely reduced deformation (i.e., warpage) and with reduced deterioration of surface appearance and mechanical properties, particularly weld strength which is problematic in the mica-filled PAS resin compositions of the prior art. Thus, the composition of the present invention has an extremely high value for practical use.

The present invention will now be described in more detail by referring to the following Examples, though the present invention is not limited by them.

Examples 1 to 6 and Comparative Examples 1 to 4

A polyphenylene sulfide resin (a product of Kureha Chemical Industry Co., Ltd., trade name: Fortlon KPS) was premixed with various white micas (Examples) or amber micas (Comparative Examples) (and, if necessary, an alkoxysilane compound) listed in Table 1 in a Henschel mixer for 5 minutes. The obtained premixes were each extruded at a cylinder temperature of 310° C. into pellets of a polyphenylene sulfide resin composition.

The pellets were molded into center-welded test pieces for tensile and bend tests with an injection molding machine at a cylinder temperature of 320° C. and a mold temperature of 150° C. with a mold having two side gates and these test pieces were examined for the tensile strength and elongation and flexural strength and elongation of the weld.

Separately, the pellets were also molded into unwelded test pieces for tensile and bend tests with a mold having one side gate and these test pieces were examined for tensile strength and elongation and flexural strength and elongation.

Further, in order to determine the warpage and deformation of a flat plate, the pellets were also molded into a flat plate (80×80×1 mm) with an injection molding machine at a cylinder temperature of 320° C. and a mold temperature of 150° C. This flat plate was placed on a surface plate to determine the clearance between the flat plate and the surface plate in the corner which is most apart from the surface plate with a clearance gauge. Thus, the warpage and deformation were evaluated.

The kind and shape of the micas used are as follows:
white mica A: muscovite
 mean particle diameter: 13 μm,
 mean aspect ratio: 30
white mica B: muscovite
 mean particle diameter: 18 μm,
 mean aspect ratio: 20
white mica C: muscovite
 mean particle diameter: 60 μm,
 mean aspect ratio: 35
amber mica A: phlogopite (Suzorite mica S-400)
 mean particle diameter: 12 μm
 mean aspect ratio: 30
amber mica B: phlogopite (Suzorite mica S-325)
 mean particle diameter: 16 μm,
 mean aspect ratio: 35
The results are given in Table 1.

Examples 7 to 10 and Comparative Examples 5 and 6

A polyphenylene sulfide resin was premixed with white mica A or amber mica A in an amount specified in Table 2. The subsequent steps were conducted in a similar manner to that of Examples 1 to 6 and Comparative Examples 1 to 4 to prepare test pieces, followed by the examination of the pieces for tensile strength and elongation, flexural strength and elongation, and the warpage and deformation of a flat plate.

The results are given in Table 2.

Examples 11 to 16 and Comparative Examples 7 to 10

A polyphenylene sulfide resin was premixed with various white or amber micas (and, if necessary an alkoxysilane) in amounts specified in Table 3 respectively in a Henschel mixer for 5 minutes. A commercially available glass fiber (diameter: 10 μm, length: 3 mm) was further added to the obtained premixes in an amount specified in Table 3, followed by the mixing for 2 minutes. In a similar manner to that of Examples 1 to 6 and Comparative Examples 1 to 4, the obtained mixtures were each molded into test pieces and the test pieces were examined for tensile strength and elongation, flexural strength and elongation, and the warpage and deformation of a flat plate. The results are given in Table 3.

TABLE 1

Examples 1 to 6 and Comparative Examples 1 to 4

| Composition | polyphenylene sulfide resin (pts. by wt.) | white mica A (pts. by wt.) | white mica B (pts. by wt.) | white mica C (pts. by wt.) | amber mica A (pts. by wt.) | amber mica B (pts. by wt.) | glass fiber (pts. by wt.) | γ-aminopropyltriethoxysilane (pts. by wt.) |
|---|---|---|---|---|---|---|---|---|
| Ex. 1 | 100 | 100 | | | | | | |
| Ex. 2 | 100 | 100 | | | | | | 1.0 |
| Ex. 3 | 100 | | 100 | | | | | |
| Ex. 4 | 100 | | 100 | | | | | 1.0 |
| Ex. 5 | 100 | | | 100 | | | | |
| Ex. 6 | 100 | | | 100 | | | | 1.0 |
| Comp. Ex. 1 | 100 | | | | 100 | | | |
| Comp. Ex. 2 | 100 | | | | 100 | | | 1.0 |
| Comp. Ex. 3 | 100 | | | | | 100 | | |

TABLE 1-continued

Examples 1 to 6 and Comparative Examples 1 to 4

| | | | | | | | | |
|---|---|---|---|---|---|---|---|---|
| Comp. Ex. 4 | 100 | | | | | 100 | | 1.0 |

| | warpage and deformation of flat plate (mm) | Tensile test | | | | Bend test | | | |
|---|---|---|---|---|---|---|---|---|---|
| | | strength (unwelded) (kg/cm$^2$) | strength (welded) (kg/cm$^2$) | strength ratio (welded/ unwelded) | elongation (welded) (%) | strength (unwelded) (kg/cm$^2$) | strength (welded) (kg/cm$^2$) | strength ratio (welded/ unwelded) | elongation (welded) (%) |
| Ex. 1 | 0.07 | 1127 | 281 | 0.25 | 0.16 | 1737 | 475 | 0.27 | 0.36 |
| Ex. 2 | 0.08 | 1183 | 305 | 0.26 | 0.17 | 1812 | 496 | 0.27 | 0.38 |
| Ex. 3 | 0.07 | 1130 | 277 | 0.25 | 0.16 | 1695 | 476 | 0.28 | 0.36 |
| Ex. 4 | 0.07 | 1150 | 286 | 0.24 | 0.16 | 1711 | 479 | 0.28 | 0.36 |
| Ex. 5 | 0.06 | 1104 | 263 | 0.24 | 0.15 | 1654 | 433 | 0.26 | 0.34 |
| Ex. 6 | 0.07 | 1138 | 269 | 0.24 | 0.15 | 1666 | 437 | 0.26 | 0.34 |
| Comp. Ex. 1 | 0.25 | 895 | 187 | 0.21 | 0.10 | 1395 | 352 | 0.25 | 0.29 |
| Comp. Ex. 2 | 0.25 | 905 | 199 | 0.22 | 0.10 | 1398 | 355 | 0.25 | 0.29 |
| Comp. Ex. 3 | 0.25 | 862 | 172 | 0.20 | 0.09 | 1363 | 347 | 0.25 | 0.27 |
| Comp. Ex. 4 | 0.25 | 875 | 178 | 0.20 | 0.09 | 1371 | 346 | 0.25 | 0.27 |

TABLE 2

Examples 7 to 10 and Comparative Examples 5 to 6

| Composition | polyphenylene sulfide resin (pts. by wt.) | white mica A (pts. by wt.) | white mica B (pts. by wt.) | white mica C (pts. by wt.) | amber mica A (pts. by wt.) | amber mica B (pts. by wt.) | glass fiber (pts. by wt.) | γ-aminopropyl-triethoxysilane (pts. by wt.) |
|---|---|---|---|---|---|---|---|---|
| Ex. 7 | 100 | 5 | | | | | | |
| Ex. 8 | 100 | 20 | | | | | | |
| Ex. 9 | 100 | 50 | | | | | | |
| Ex. 10 | 100 | 150 | | | | | | |
| Comp. Ex. 5 | 100 | | | | | | | |
| Comp. Ex. 6 | 100 | | | | | | 50 | |

| | warpage and deformation of flat plate (mm) | Tensile test | | | | Bend test | | | |
|---|---|---|---|---|---|---|---|---|---|
| | | strength (unwelded) (kg/cm$^2$) | strength (welded) (kg/cm$^2$) | strength ratio (welded/ unwelded) | elongation (welded) (%) | strength (unwelded) (kg/cm$^2$) | strength (welded) (kg/cm$^2$) | strength ratio (welded/ unwelded) | elongation (welded) (%) |
| Ex. 7 | 1.02 | 872 | 476 | 0.55 | 0.53 | 1003 | 562 | 0.56 | 0.75 |
| Ex. 8 | 0.40 | 944 | 418 | 0.44 | 0.41 | 1227 | 536 | 0.44 | 0.61 |
| Ex. 9 | 0.21 | 1030 | 361 | 0.35 | 0.28 | 1452 | 507 | 0.35 | 0.47 |
| Ex. 10 | 0.05 | 1160 | 195 | 0.17 | 0.09 | 1949 | 443 | 0.23 | 0.29 |
| Comp. Ex. 5 | 4.51 | 855 | 531 | 0.62 | 6.0 | 941 | 591 | 0.63 | 7.5 |
| Comp. Ex. 6 | 0.33 | 917 | 274 | 0.30 | 0.23 | 1203 | 398 | 0.33 | 0.39 |

TABLE 3

Examples 11 to 16 and Comparative Examples 7 to 10

| Composition | polyphenylene sulfide resin (pts. by wt.) | white mica A (pts. by wt.) | white mica B (pts. by wt.) | white mica C (pts. by wt.) | amber mica A (pts. by wt.) | amber mica B (pts. by wt.) | glass fiber (pts. by wt.) | γ-aminopropyl-triethoxysilane (pts. by wt.) |
|---|---|---|---|---|---|---|---|---|
| Ex. 11 | 100 | 50 | | | | | 100 | |
| Ex. 12 | 100 | 100 | | | | | 50 | |
| Ex. 13 | 100 | 100 | | | | | 100 | |
| Ex. 14 | 100 | 100 | | | | | 100 | 1.0 |
| Ex. 15 | 100 | | 100 | | | | 100 | |
| Ex. 16 | 100 | | 100 | | | | 100 | 1.0 |
| Comp. Ex. 7 | 100 | | | | 100 | | 100 | |
| Comp. Ex. 8 | 100 | | | | | 100 | 100 | |
| Comp. Ex. 9 | 100 | | | | | 100 | 100 | 1.0 |
| Comp. Ex. 10 | 100 | | | | | | 100 | |

| | warpage and deformation of flat plate (mm) | Tensile test | | | | Bend test | | | |
|---|---|---|---|---|---|---|---|---|---|
| | | strength (unwelded) (kg/cm$^2$) | strength (welded) (kg/cm$^2$) | strength ratio (welded/ unwelded) | elongation (welded) (%) | strength (unwelded) (kg/cm$^2$) | strength (welded) (kg/cm$^2$) | strength ratio (welded/ unwelded) | elongation (welded) (%) |
| Ex. 11 | 0.85 | 1712 | 523 | 0.31 | 0.26 | 2476 | 706 | 0.29 | 0.48 |
| Ex. 12 | 0.35 | 1432 | 485 | 0.34 | 0.28 | 2310 | 669 | 0.29 | 0.52 |
| Ex. 13 | 0.70 | 1655 | 335 | 0.20 | 0.15 | 2739 | 642 | 0.23 | 0.28 |
| Ex. 14 | 0.70 | 1725 | 358 | 0.21 | 0.16 | 2804 | 683 | 0.24 | 0.29 |

TABLE 3-continued

| | Examples 11 to 16 and Comparative Examples 7 to 10 | | | | | | | | |
|---|---|---|---|---|---|---|---|---|---|
| Ex. 15 | 0.65 | 1650 | 318 | 0.19 | 0.14 | 2607 | 592 | 0.23 | 0.26 |
| Ex. 16 | 0.70 | 1695 | 326 | 0.20 | 0.15 | 2713 | 625 | 0.23 | 0.27 |
| Comp. Ex. 7 | 1.30 | 1425 | 261 | 0.18 | 0.11 | 2275 | 461 | 0.20 | 0.21 |
| Comp. Ex. 8 | 1.25 | 1380 | 235 | 0.17 | 0.10 | 2260 | 451 | 0.20 | 0.20 |
| Comp. Ex. 9 | 1.25 | 1411 | 260 | 0.18 | 0.11 | 2310 | 486 | 0.21 | 0.21 |
| Comp. Ex. 10 | 6.9 | 1833 | 687 | 0.37 | 0.58 | 2750 | 993 | 0.36 | 0.70 |

We claim:

1. A polyarylene sulfide resin molding composition comprising
    (A) 100 parts by weight of a polyarylene sulfide resin and
    (B) 5 to 150 parts by weight of white mica which has a mean particle diameter of 2 to 65 microns and a mean aspect ratio of 10 to 60.

2. A polyarylene sulfide resin molding composition as set forth in claim 1, which further contains (C) 1 to 150 parts by weight of other filler per 100 parts by weight of the polyarylene sulfide resin.

3. A polyarylene sulfide resin molding composition as set forth in claim 2, wherein said filler (C) is a fibrous one.

4. A polyarylene sulfide resin molding composition as set forth in claim 1 or 2, which further contains (D) 0.1 to 5 parts by weight of an alkoxysilane compound per 100 parts by weight of the polyarylene sulfide resin.

5. A polyarylene sulfide resin molding composition as set forth in claim 2 which further contains (D) 0.1 to 5 parts by weight of an alkoxysilane compound per 100 parts by weight of the polyarylene sulfide resin.

6. A polyarylene sulfide resin molding composition as set forth in claim 3 which further contains (D) 0.1 to 5 parts by weight of an alkoxysilane compound per 100 parts by weight of the polyarylene sulfide resin.

7. A polyarylene sulfide resin molding composition as set forth in claim 1 wherein said white mica contains at most 5% by weight MgO.

8. A polyarylene sulfide resin molding composition as set forth in claim 7 wherein said white mica contains up to 2% by weight of MgO.

9. A polyarylene sulfide resin molding composition as set forth in claim 1 wherein said white mica has a mean particle diameter of 2-30 μm.

10. A polyarylene sulfide resin molding composition as set forth in claim 9 wherein said white mica has a mean aspect ratio of 10-50.

11. A polyarylene sulfide resin molding composition as set forth in claim 1 wherein said white mica is present in amounts of 10 to 100 parts by weight per 100 weight of the polyarylene sulfide resin.

12. A polyarylene sulfide resin molding composition as set forth in claim 3 wherein said filler (C) in glass fibers.

13. A polyarylene sulfide resin molding composition as set forth in claim 4 wherein said alkoxy silane compound (D) comprises an amino alkoxysilane.

* * * * *